United States Patent
Tabata et al.

(10) Patent No.: US 8,826,151 B2
(45) Date of Patent: Sep. 2, 2014

(54) INFORMATION PROCESSING APPARATUS AND COMPUTER-READABLE MEDIUM FOR VIRTUALIZING AN IMAGE PROCESSING APPARATUS

(75) Inventors: Yasuhiro Tabata, Kanagawa (JP); Takashi Yano, Tokyo (JP); Katsuyuki Kaji, Tokyo (JP); Kenta Nozaki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1023 days.

(21) Appl. No.: 12/923,297

(22) Filed: Sep. 14, 2010

(65) Prior Publication Data
US 2011/0063674 A1    Mar. 17, 2011

(30) Foreign Application Priority Data
Sep. 15, 2009    (JP) ................................ 2009-213576

(51) Int. Cl.
   *G06F 3/048*       (2013.01)
   *G06F 3/00*        (2006.01)

(52) U.S. Cl.
   USPC ............ 715/757; 715/848; 715/850; 715/852

(58) Field of Classification Search
   USPC .................. 715/734, 753, 757, 848, 850, 852
   See application file for complete search history.

(56) References Cited

U.S. PATENT DOCUMENTS

| | | | |
|---|---|---|---|
| 5,958,012 A * | 9/1999 | Battat et al. .................. 709/224 |
| 6,400,364 B1 * | 6/2002 | Akisada et al. ............... 345/427 |
| 6,718,215 B2 * | 4/2004 | Friedrich et al. ............... 700/65 |
| 7,788,587 B2 * | 8/2010 | Michelman .................. 715/734 |
| 8,145,516 B2 * | 3/2012 | Blanchard et al. .......... 705/7.12 |
| 2009/0319058 A1 * | 12/2009 | Rovaglio et al. ................ 700/17 |
| 2010/0208033 A1 * | 8/2010 | Edge et al. ...................... 348/46 |
| 2011/0209145 A1 * | 8/2011 | Chen et al. ........................ 718/1 |

FOREIGN PATENT DOCUMENTS

| | | |
|---|---|---|
| JP | 2003-30469 | 1/2003 |
| JP | 2004-348647 | 12/2004 |
| JP | 2007-249941 | 9/2007 |

* cited by examiner

*Primary Examiner* — Nicholas Augustine
(74) *Attorney, Agent, or Firm* — Harness, Dickey & Pierce, P.L.C.

(57) ABSTRACT

An information processing apparatus is connected via a network to both an MFP and a virtual-space management server that manages a virtual space that contains a virtual device that is created by virtualizing the MFP. The information processing apparatus includes a display control unit that displays map information on a display unit, wherein a device symbol that corresponds to the MFP is present in the map information at a position corresponding to the position of the MFP in the real world; a receiving unit that receives a selected device symbol in the map information; an output control unit that outputs image data to either a first data storage unit of the MFP that corresponds to the selected device symbol or to a second data storage unit for the virtual device that is created by virtualizing the MFP and corresponds to the selected device symbol.

19 Claims, 14 Drawing Sheets

FIG. 3

| MFP-ID | REAL-MFP ADDRESS | VIRTUAL MFP ADDRESS | MANUFACTURE NAME/PRODUCT-TYPE NAME | STATIC INFORMATION ||||||| DYNAMIC INFORMATION |||
| --- | --- | --- | --- | --- | --- | --- | --- | --- | --- | --- | --- | --- |
| | | | | PRINTING FUNCTION ||| SCANNING FUNCTION ||| | | |
| | | | | COLOR | SHEET SIZE | POST-PRO-CESSING | FAX | MAIL | FILE | LOCATION | SHEET SIZE | USE STATUS (QUEUING TIME) |
| Syrah 01 | 192.168.X.X | http://mfp.com/1/ | R CORPORATION/ MX210 | FULL COLOR | A3 | STAPLER | | O | O | TOKYO 12 F | A4 A3 | 15 MIN |
| Syrah 02 | FOLDER A | http://mfp.com/2/ | R CORPORATION/ MX210 | FULL COLOR | A3 | STAPLER | | O | O | N.Y. 45 F | A4 A3 | 0 MIN |
| Grenache | 192.168.Y.Y | http://mfp.com/3/ | R CORPORATION/ MX440 | FULL COLOR | A3 | N/A | O | | | N.Y. 45 F | A4 | 0 MIN |
| Pinot 01 | FOLDER B | http://mfp.com/4/ | R CORPORATION/ MX30 | MONO-CHROME | A2 | N/A | | | | SHANGHAI B F | A3 A2 | 5 MIN |

INFORMATION PROCESSING APPARATUS AND COMPUTER-READABLE MEDIUM FOR VIRTUALIZING AN IMAGE PROCESSING APPARATUS

PRIORITY CLAIM

The present application claims priority to and incorporates by reference the entire contents of Japanese Patent Application No. 2009-213576 filed in Japan on Sep. 15, 2009.

BACKGROUND OF THE INVENTION

1. Field of the Invention

The present invention relates to an information processing apparatus and a computer-readable medium or a computer program product including a computer program.

2. Description of the Related Art

Modern offices have many image forming apparatuses, such as printers. These image forming apparatuses are connected to a network in a way that makes them accessible from various locations, including locations outside the office. In order to select a desired printer from the available printers intuitionally, Japanese Patent Application Laid-open No. 2007-249941 discloses a technology for displaying a map image with icons representing the printers arranged at their respective positions.

In recent years, three-dimensional (3D) virtual spaces on a network have become popular, such as Second Life (registered trademark). In a 3D virtual space, various objects, such as houses, land, devices, and avatars that are metaphors of users, are managed in the same manner as in the real world. Because the amount of data managed in 3D virtual spaces is large, in a typical 3D virtual space, data is managed by a plurality of virtual-space management servers.

Users can operate the devices, etc. that are present in the virtual space using their avatars. Thus, users can act in the 3D virtual space in the same manner as they would act in the real world. Therefore, for example, it is possible to create a space in the virtual space as a metaphor of a real office (closed space) and have users carry out tasks in the virtual space. If this idea is realized, the representation of reality in the virtual world and the operability will be improved. In such a virtual office, it is possible to input data that is used in the real world to the virtual space and to execute a job using the input data in the virtual space. In this case, an easy method is preferable for inputting data that is used in the real world to the virtual space.

The technology disclosed in Japanese Patent Application Laid-open No. 2007-249941 can provide, for example, a method of inputting data used in the real world to the virtual space. More particularly, the technology provides a method of selecting an icon that represents a desired virtual-space management server, which processes data to be input from map information containing a plurality of icons each representing a virtual-space management service.

However, the method needs to select another folder that corresponds to a device for processing data to be input, from the folders in a memory managed by the virtual-space management server that corresponds to a selected icon. That is, the technology disclosed in Japanese Patent Application Laid-open No. 2007-249941 cannot provide an easy method of inputting data used in the real world to the virtual space.

SUMMARY OF THE INVENTION

It is an object of the present invention to at least partially solve the problems in the conventional technology.

One aspect of the invention relates to an information processing apparatus that is connected to both an image processing apparatus and a virtual-space management device via a network, wherein the image processing apparatus includes a first data storage unit, and the virtual-space management device manages a virtual space that contains a virtual device that is created by virtualizing the image processing apparatus and includes a second data storage unit for the virtual device.

The information processing apparatus includes: a display control unit that displays map information on a display unit, wherein a device symbol that corresponds to the image processing apparatus is present at a position corresponding to a position of the image processing apparatus in a real world; a receiving unit that receives a selection of the device symbol in the map information; and an output control unit that outputs image data to either the first data storage unit of the image processing apparatus that corresponds to the selected device symbol or the second data storage unit for the virtual device that is created by virtualizing the image processing apparatus and corresponds to the selected device symbol.

Another aspect of the invention is directed to a computer-readable medium having a program including instructions for an information processing apparatus that is connected to both an image processing apparatus and a virtual-space management device via a network, wherein the image processing apparatus includes a first data storage unit, and the virtual-space management device manages a virtual space that contains a virtual device that is created by virtualizing the image processing apparatus and includes a second data storage unit for the virtual device.

The instructions cause the information processing apparatus to function as: a display control unit that displays map information on a display unit, wherein a device symbol that corresponds to the image processing apparatus is present at a position corresponding to a position of the image processing apparatus in a real world; a receiving unit that receives a selection of the device symbol in the map information; and an output control unit that outputs image data to either the first data storage unit of the image processing apparatus that corresponds to the selected device symbol or the second data storage unit for the virtual device that is created by virtualizing the image processing apparatus and corresponds to the selected device symbol.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of the structure of device information that is stored in a device-information storage unit;

DETAILED DESCRIPTION OF THE PREFERRED EMBODIMENTS

Exemplary embodiments of information processing apparatuses and computer-readable media or computer program products including computer programs according to the present invention are described in detail below with reference to the accompanying drawings.

First Embodiment

Figure 1:
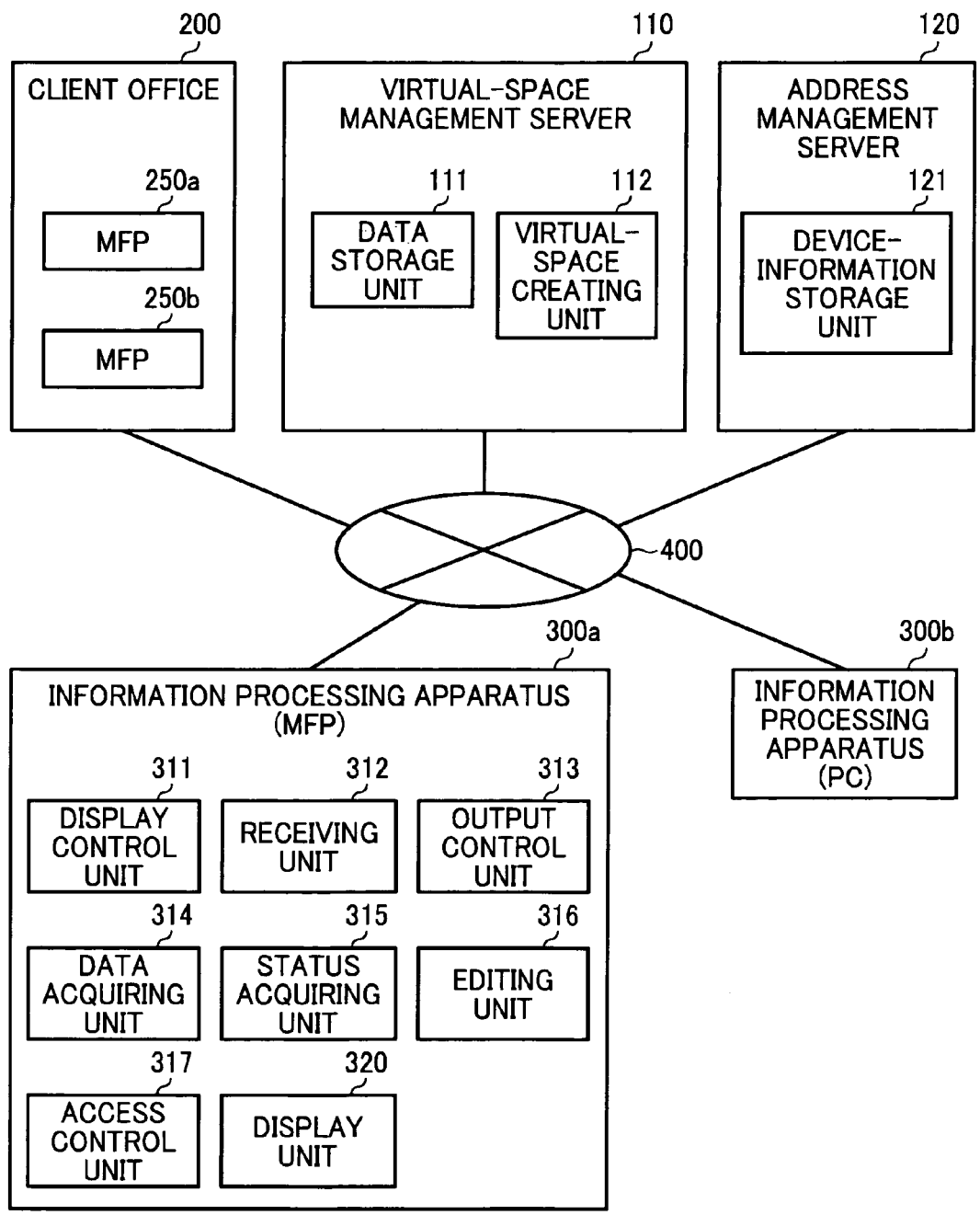
FIG. 1 is a block diagram of an example of the configuration of an information processing system that includes information processing apparatuses according to a first embodiment.

FIG. 1 is a block diagram of an example of the configuration of an information processing system that includes information processing apparatuses according to a first embodiment.

As shown in FIG. 1, the information processing system according to the first embodiment includes a client office 200, a virtual-space management server 110, an address management server 120, and information processing apparatuses 300a and 300b, or 300 where collectively referred to, all of which are connected to each other via a network 400.

The network 400 can be any network, such as a local area network (LAN) and the Internet.

The client office 200 represents, for example, a work space in which users work using personal computers (PCs) (not shown in FIG. 1) and image processing apparatuses, such as multifunction peripherals (MFPs)250a and 250b, or 250 where collectively referred to. The client office 200 represents, for example, a work space that corresponds to one floor of a certain company. Although only one client office 200 is shown in FIG. 1, two or more client offices 200 each corresponds to a certain company or a certain floor can be present.

Moreover, although the client office 200 used in the present embodiment includes the two MFPs 250a and 250b, the number of the MFP 250 can be less than or more than two.

The virtual-space management server 110 functions as a virtual-space management device that manages a 3D virtual space, such as Second Life (registered trademark). The virtual space is not limited to a three dimension, and can be, for example, a two-dimensional virtual space. The virtual-space management server 110 manages, in the 3D virtual space, virtual devices that are created by virtualizing the MFPs 250 included in the client office 200 (hereinafter, "virtual MFPs"). The virtual-space management server 110 includes a data storage unit 111 and a virtual-space creating unit 112.

The data storage unit 111 stores therein data that is used in the virtual-space management server 110. For example, the data storage unit 111 has folders that are assigned to the virtual MFPs, respectively. The data storage unit 111 stores image data that is to be processed by a certain virtual MFP in the corresponding folder (second data storage unit).

Although only one unit of the virtual-space management server 110 is shown in FIG. 1, the virtual-space management server 110 can be formed either one unit or a plurality of physical devices. Moreover, the data storage unit 111 can be formed either one recording medium or a plurality of physical recording media.

The virtual-space creating unit 112 creates 3D computer graphics (CG) for illustrating selected map information of a 3D virtual space. When, for example, the map information of the client office 200 shown in FIG. 1 is created, the virtual-space creating unit 112 creates the map information (3D CG) of the client office 200. More particularly, the virtual-space creating unit 112 creates 3D CG of map information that includes symbols (device symbols), such as icons that represent the devices that are actually present in the client office 200, arranged at the positions of the respective objects (e.g., MFPs 250a and 250b). It is allowable to configure the virtual-space creating unit 112 to create two-dimensional map information of an area viewed from the above, instead of the 3D map information.

The virtual-space creating unit 112 identifies the position of each object by referring to, for example, a storage unit (not shown) or similar that stores therein the position of each object. For example, the map information of each client office 200 is created and the created map information is stored in a storage unit (not shown) or similar. The map information includes, for example, information indicative of the position of the real device or the virtual device that is present in the corresponding area. The map information is stored in associated with the name of the corresponding area (area name) and the names of users who are members of the department that occupies the area. Therefore, the corresponding map information is found by the area name or the user name.

Moreover, if a virtual user used in a 3D virtual space is present in the selected map information, the virtual-space creating unit 112 creates the map information that contains a symbol (user symbol), for example, an avatar that represents the user. The avatar is displayed so that the user can make an action with, for example, an avatar of another user and an object that appears on the map information.

The above processes performed by the virtual-space creating unit 112 are implementable using technologies that are used in, for example, Second Life (registered trademark). The map information created by the virtual-space creating unit 112 is sent to a requester, for example, the information processing apparatus 300. It is allowable to send information that is necessary to create the map information to the requester, for example, the information processing apparatus 300 and create the map information by using an application on the information processing apparatus 300.

Figure 2:
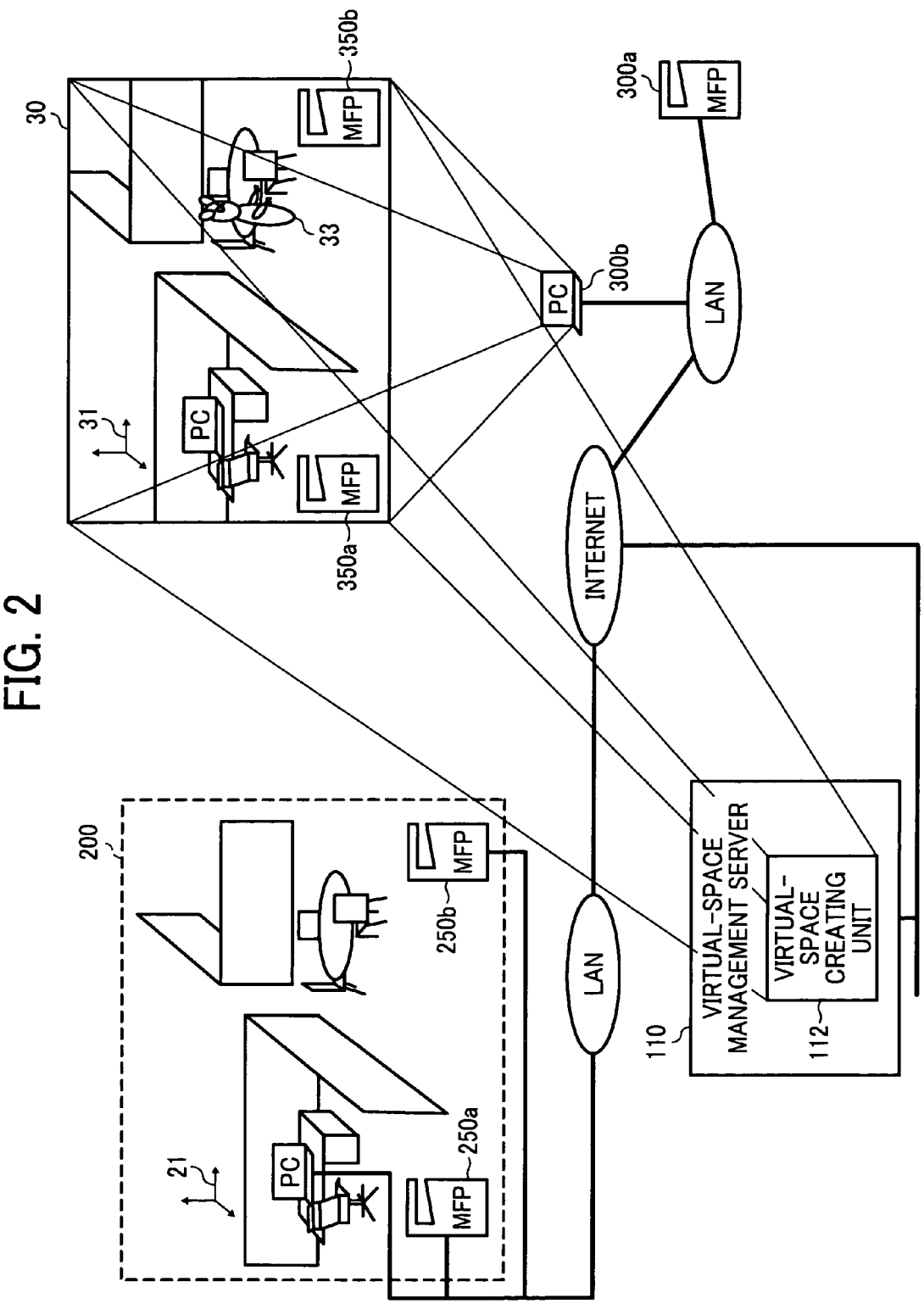
FIG. 2 is a schematic diagram that illustrates the relation between the real world and the virtual space.

An example of the virtual space that is created by the virtual-space creating unit 112 is described below. FIG. 2 is a schematic diagram that illustrates the relation between the real world and the virtual space. In the present embodiment, the coordinate axes of the virtual space are set corresponding to the coordinate axes of the client office 200 in the real world. A set of coordinate axes 31 of a virtual space 30 shown in FIG. 2 corresponds to a set of coordinate axes 21 of the client office 200 in the real world. The virtual space 30 shown in FIG. 2 is a schematically illustrated virtual space that is created by the virtual-space creating unit 112. As shown in FIG. 2, virtual MFPs 350a and 350b are illustrated in the virtual space 30. The virtual MFPs 350a and 350b correspond to the MFPs 250a and 250b, respectively that are present in the client office 200 in the real world. In the example shown in FIG. 2, an avatar 33 is illustrated in the virtual space 30 in the shape like an animal.

Referring back to FIG. 1, the address management server 120 manages information containing the address of each device including the real MFPs 250 and the virtual MFPs. The address management server 120 includes a device-information storage unit 121 that stores therein information containing the status and the address of each device. FIG. 3 is an example of the structure of the device information that is stored in the device-information storage unit 121. As shown in FIG. 3, the device information contains MFP-ID, real-MFP address, virtual-MFP address, manufacture name/product-type name, static information, and dynamic information.

The MFP-ID is information for identifying the real MFP 250. In the example shown in FIG. 3, the name (nickname) of the MFP 250 is stored as the MFP-ID. The real-MFP address is used to make an access to the real MFP 250. In the example shown in FIG. 3, the IP address of the MFP 250 is stored as the real-MFP address. The virtual-MFP address is used to make an access to the virtual MFP in the 3D virtual space that corresponds to the MFP 250. In the example shown in FIG. 3, the URL that is assigned to the virtual MFP is stored as the virtual-MFP address. Each URL is assigned to, for example, any folder of the data storage unit 111 of the virtual-space management server 110. The manufacture name/product-type name indicates the manufacture name and the product-type name of the MFP 250.

The static information indicates functions of the MFP 250. In the example shown in FIG. 3, the static information contains printing function and scanning function. As shown in FIG. 3, the printing function contains, for example, color (full color or monochrome), sheet size (e.g., A3, A2, etc.), and post-processing (e.g., stapler, N/A, etc.). The scanning function contains, for example, Fax function ("o" or blank), mail function ("o" or blank), and file save function ("o" or blank).

The above static information is merely one example. Some other information can be contained, such as duplex copy function, color copy function, zoom in/out function, two-in-one function (copying two pages in one page), sorting function, and stapling function.

The dynamic information indicates the operating status of the MFP 250. In the example shown in FIG. 3, the dynamic information contains a location indicative of the position of the MFP 250, a sheet size, and a use status (queuing time). The above dynamic information is merely one example. Some other information can be contained, such as the status of stand-by, power-off, failure, toner shortage, paper jam, and occupied by another user.

The manner of managing the device information (address information) is not limited thereto. Any manner can be used so long as, in response to a request received from a certain device, for example, the information processing apparatus 300, the information is available about the real device or the information about the virtual device that corresponds to the real device. Moreover, it is allowable to configure the virtual-space management server 110 to have the functions of the address management server 120.

The data storage unit 111 of the virtual-space management server 110 and the device-information storage unit 121 of the address management server 120 can be any widely-used recording media, such as a hard disk drive (HDD), an optical disk, a memory card, and a random access memory (RAM).

Referring back to FIG. 1, the information processing apparatuses 300a and 300b are user-operable terminal devices. In the example shown in FIG. 1, the information processing apparatus 300a is an MFP and the information processing apparatus 300b is a PC. The information processing apparatuses 300 can be any devices so long as it has later-described functions.

The user can use various functions of the 3D virtual space by accessing the virtual-space management server 110 via the information processing apparatus 300. Moreover, the user can use the real MFPs 250 directly via the information processing apparatus 300.

The information processing apparatus 300 includes a display unit 320, a display control unit 311, a receiving unit 312, an output control unit 313, a data acquiring unit 314, a status acquiring unit 315, an editing unit 316, and an access control unit 317.

The display unit 320 displays data or similar to be processed by the information processing apparatus 300. The display unit 320 is, for example, a display device or an operation panel that also works as the receiving unit 312.

The display control unit 311 controls display on the display unit 320. For example, the display control unit 311 receives the map information that is created by the virtual-space creating unit 112 of the virtual-space management server 110 and displays the map information on the display unit 320.

The receiving unit 312 receives objects selected by the user and information specified by the user. For example, the receiving unit 312 receives an icon that corresponds to a certain MFP that has been selected from the displayed map information. Moreover, the receiving unit receives a selected destination of the image data (either the real world or the virtual space) and selected map information to be displayed on the display unit 320.

The output control unit 313 controls data output to external devices, such as the MFPs 250 and the virtual-space management server 110. For example, the output control unit 313 outputs the image data to either the MFP 250 or the virtual MFP in accordance with the selected destination.

The data acquiring unit 314 acquires data to be processed. If the information processing apparatus 300 is, for example, an MFP (the information processing apparatus 300a), the data acquiring unit 314 can be configured to have the scanning function, more particularly, read an original and acquire image data from the original. The data acquiring manner is not limited thereto. It is allowable to acquire data from an inner storage unit (not shown) and an external device.

The status acquiring unit 315 acquires the operating status of the MFP 250 that is selected to be the destination. For example, the status acquiring unit 315 acquires the dynamic information about the selected MFP 250 from the device-information storage unit 121 of the address management server 120. The manner of acquiring the operating status is not limited thereto. For example, it is allowable to acquire the operating status directly from the selected MFP 250.

The editing unit 316 edits the image data and outputs the edited image data. The editing unit 316, for example, performs masking to mask some parts, thereby editing the image data. The editing process is not limited thereto. Any editing process can be performed, for example, trimming or zooming in/out the image data.

The access control unit 317 controls access from, for example, the MFPs 250 and the virtual-space management server 110 to an external device. For example, the access control unit 317 performs an authentication process that involves sending authentication information that contains, for example, the user name and the password to the virtual-space management server 110 and then receiving an access permission.

Figure 4:
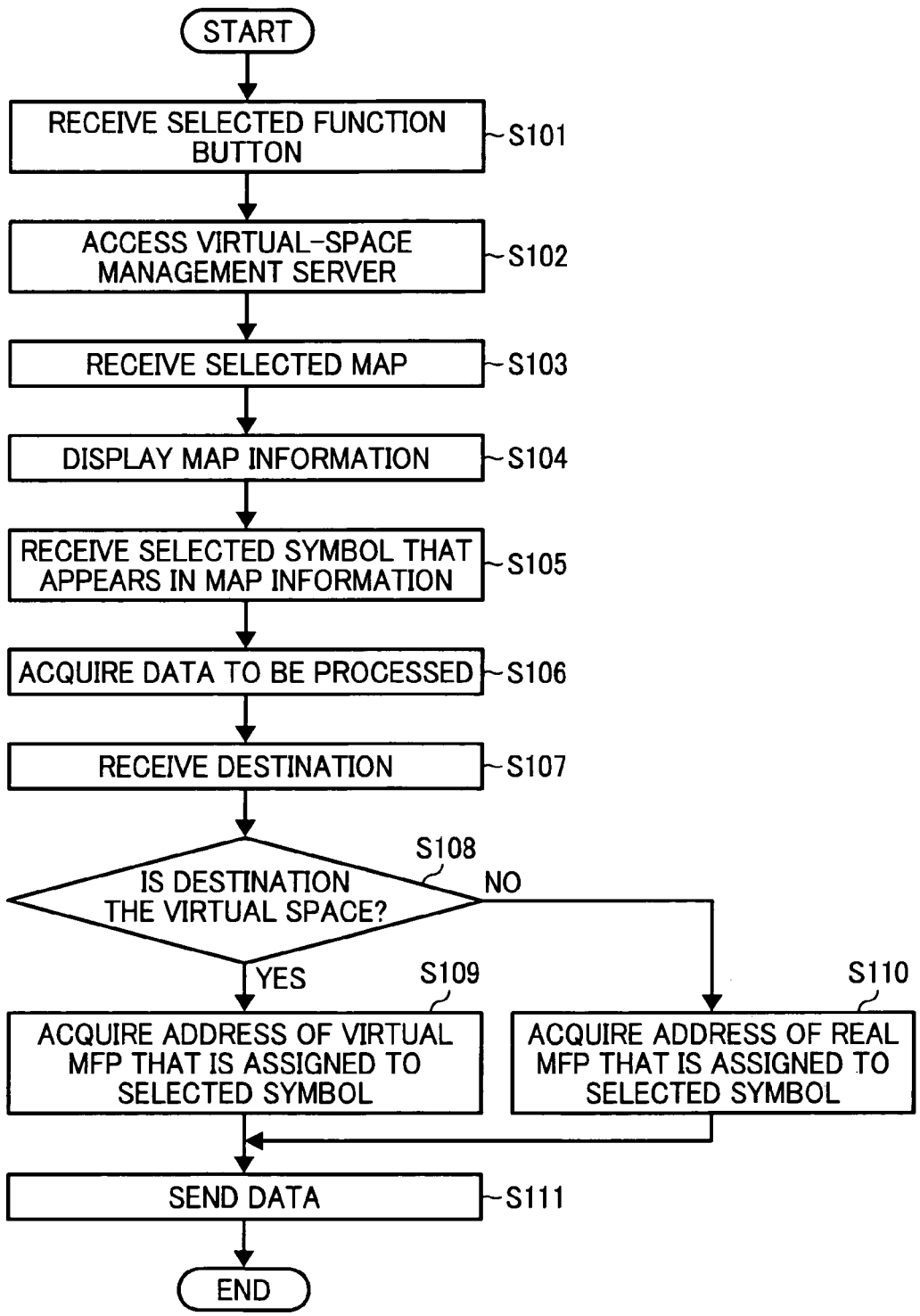
FIG. 4 is a general flowchart of a data sending process according to the first embodiment.

A data sending process performed by the information processing apparatus 300 is described below according to the first embodiment with reference to FIG. 4. FIG. 4 is a general flowchart of the data sending process according to the first embodiment. FIG. 4 illustrates an example of the data sending process when the information processing apparatus 300 is an MFP (the information processing apparatus 300a).

The receiving unit 312 receives a selected function button that is allocated to access activity to the virtual-space management server 110, (Step S101). The access control unit 317 then performs the authentication process to make an access to the virtual-space management server 110 (Step S102).

If, during the authentication process, an access permission is received from the virtual-space management server 110, the receiving unit 312 receives selected map information to be displayed (Step S103). For example, the virtual-space management server 110 can be configured to send both the result of the authentication process and selectable map information to the information processing apparatus 300.

Figure 5:
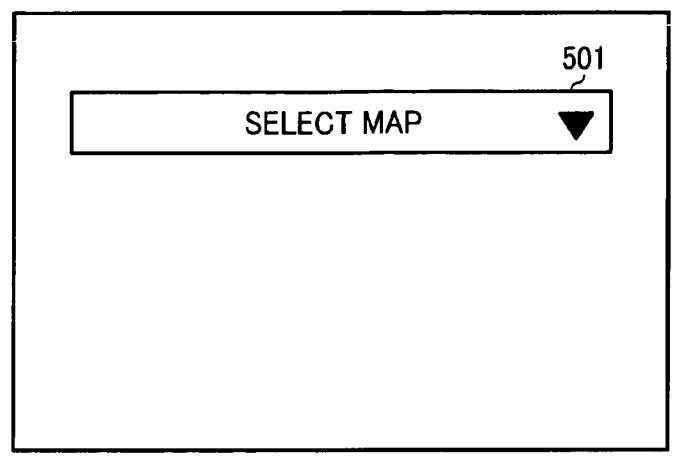
FIG. 5 is a schematic diagram of an example of a map selecting screen that is used to select map information.

FIG. 5 is a schematic diagram of an example of a map selecting screen that is used to select map information. In the example shown in FIG. 5, map information is selected from a pull-down menu 501 with the message "Select a map". Although not shown in FIG. 5, when the pull-down menu 501 is pressed, a list of the selectable map information is displayed.

Figure 6:
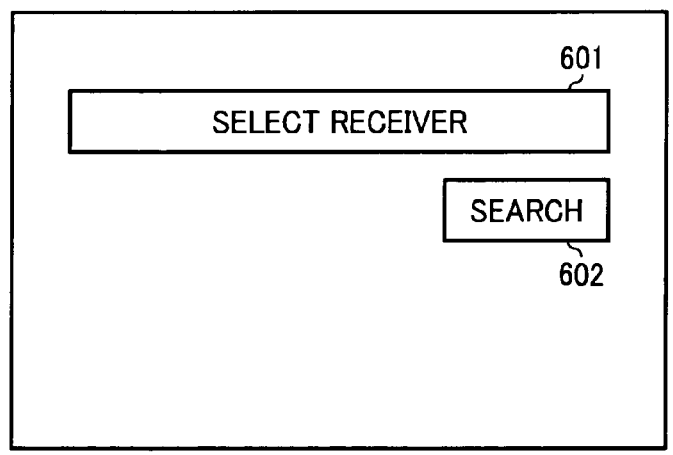
FIG. 6 is a schematic diagram of an example of a search screen that is used to search for map information.
Figure 7:
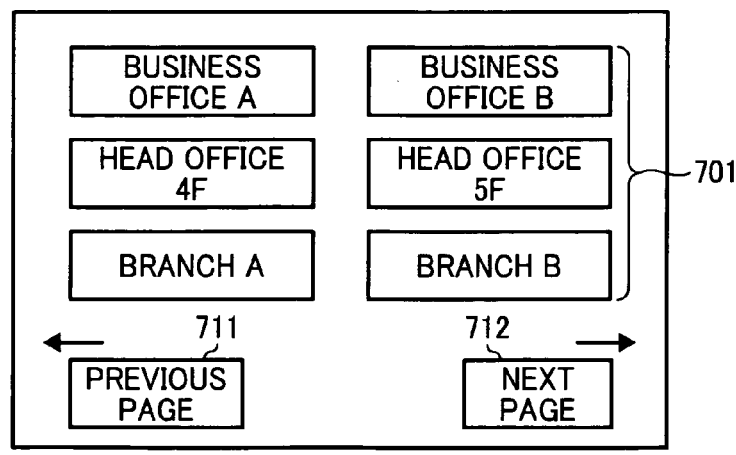
FIG. 7 is a schematic diagram of another example of the map selecting screen that is used to select map information.
Figure 8:
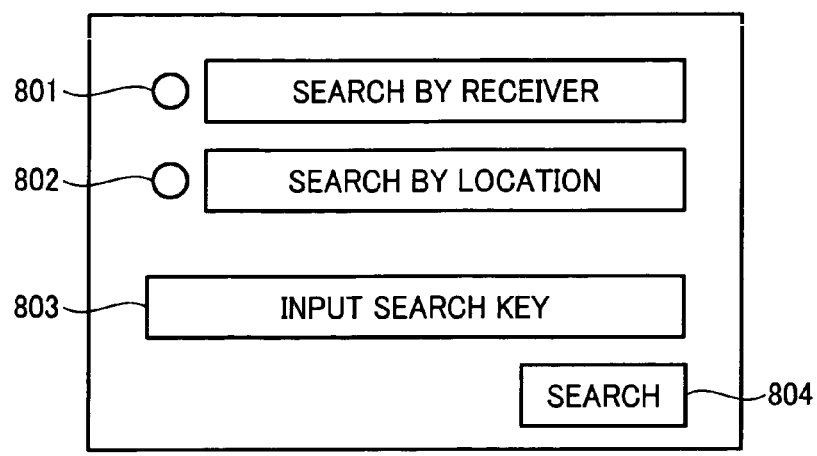
FIG. 8 is a schematic diagram of another example of the search screen that is used to search for map information.

Some other widely-used methods can be used for selecting map information. FIGS. 6 to 8 are schematic diagrams that explain some other examples of the map-information selecting method.

FIG. 6 is a schematic diagram of an example of a search screen that is used to search for map information. If the search screen shown in FIG. 6 is used, the user inputs, to a text box 601 with the message, for example, "Input a receiver", the user name of the receiver and presses a search button 602. The map information is then selected in accordance with, for example, the department to which the specified receiver belongs. It is allowable to be configured to select map information of a virtual space where the avatar representing the specified receiver is present.

FIG. 7 is a schematic diagram of another example of the map selecting screen that is used to select map information. In the example shown in FIG. 7, map information is selected using a plurality of buttons 701 each allocated to corresponding map information. When a previous page button 711 or a next page button 712 is pressed, some other buttons each allocated to corresponding map information are displayed.

FIG. 8 is a schematic diagram of another example of the search screen that is used to search for map information. If the search screen shown in FIG. 8 is used, the user selects either an option button 801 or an option button 802, thereby selecting the map-information search manner from the manner using the receiver and the manner using the name of the location (location name). The user then inputs necessary data to a text box 803, for example, the user name of the receiver or the location name in accordance with the selected option button 801 or 802 and presses a search button 804. The map information is then selected in accordance with, for example, the department to which the specified receiver belongs or the specified location name.

Figure 9:
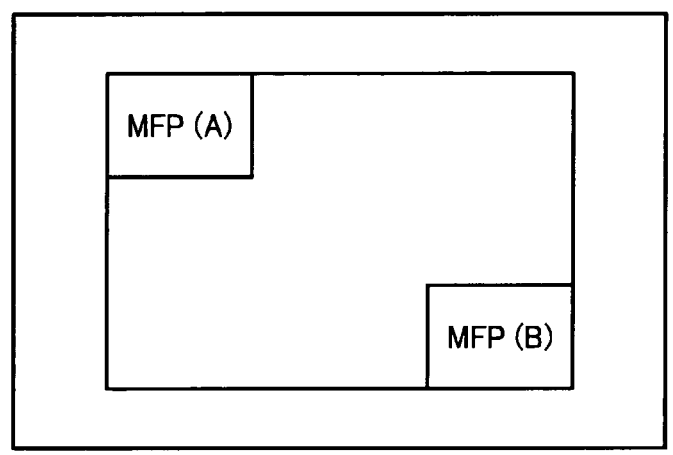
FIG. 9 is a schematic diagram of an example of displayed map information.

Referring back to FIG. 4, the display control unit 311 displays the selected map information to the display unit 320 (Step S104). FIG. 9 is a schematic diagram of an example of the displayed map information. FIG. 9 is an example of the map information of the client office 200. As shown in FIG. 9, the map information contains two icons MFP (A) and MFP (B) that correspond to the two MFPs 250a and 250b of the client office 200, respectively. Although not shown in FIG. 9, the avatar that represents the user is displayed on the map information. The user can select, via the avatar on the map, either the MFP (A) or the MFP (B) to be the destination of the image data.

Referring back to FIG. 4, the receiving unit 312 receives the icon (symbol) that has been selected by the user (Step S105). After that, the data acquiring unit 314 acquires image data to be processed (Step S106). For example, the data acquiring unit 314 scans the original, thereby acquiring image data. The timing to acquire the image data can be set to be any timing so long as the image data is acquired before the time to send the image data to the destination.

The receiving unit 312 receives the selected destination (Step S107). The destination indicates either the real world or the virtual space. In other words, the destination indicates either the real MFP 250 corresponding to the selected icon or the virtual MFP corresponding to the selected icon.

Figure 10:
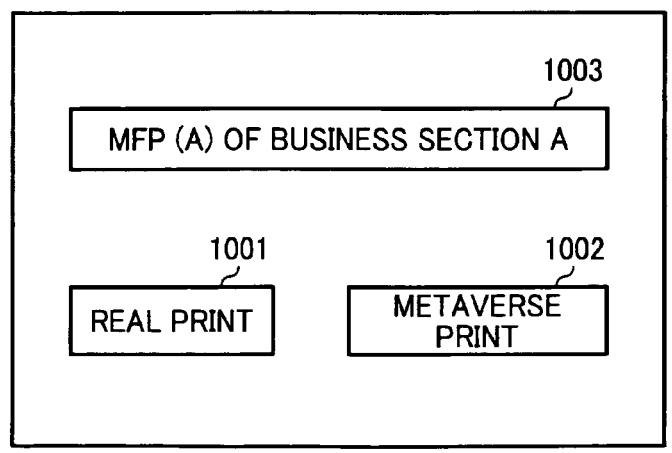
FIG. 10 is a schematic diagram of an example of a destination selecting screen that is used to select the destination.

FIG. 10 is a schematic diagram of an example of a destination selecting screen that is used to select the destination. In the example shown in FIG. 10, the destination is selected using buttons 1001 and 1002. When the button 1001 is pressed, the real world is selected to be the destination. When the button 1002 is pressed, the virtual space is selected to be the destination. A label 1003 is an area on which the name and the location are displayed in accordance with the MFP 250 that corresponds to the icon selected at Step S105.

Referring back to FIG. 4, the status acquiring unit 315 determines whether the selected destination is the virtual space (Step S108). If the virtual space is selected (Yes at Step S108), the status acquiring unit 315 acquires the address of the virtual MFP corresponding to the selected icon (symbol) from the device-information storage unit 121 of the address management server 120 (Step S109). If the virtual space is not selected, i.e., the real world is selected (No at Step S108), the status acquiring unit 315 acquires the address of the real MFP 250 corresponding to the selected icon (symbol) from the device-information storage unit 121 of the address management server 120 (Step S110).

After that, the output control unit 313 sends the image data that has been acquired at Step S106 to the acquired address (Step S111), and thus the data sending process goes to end.

Figure 11:
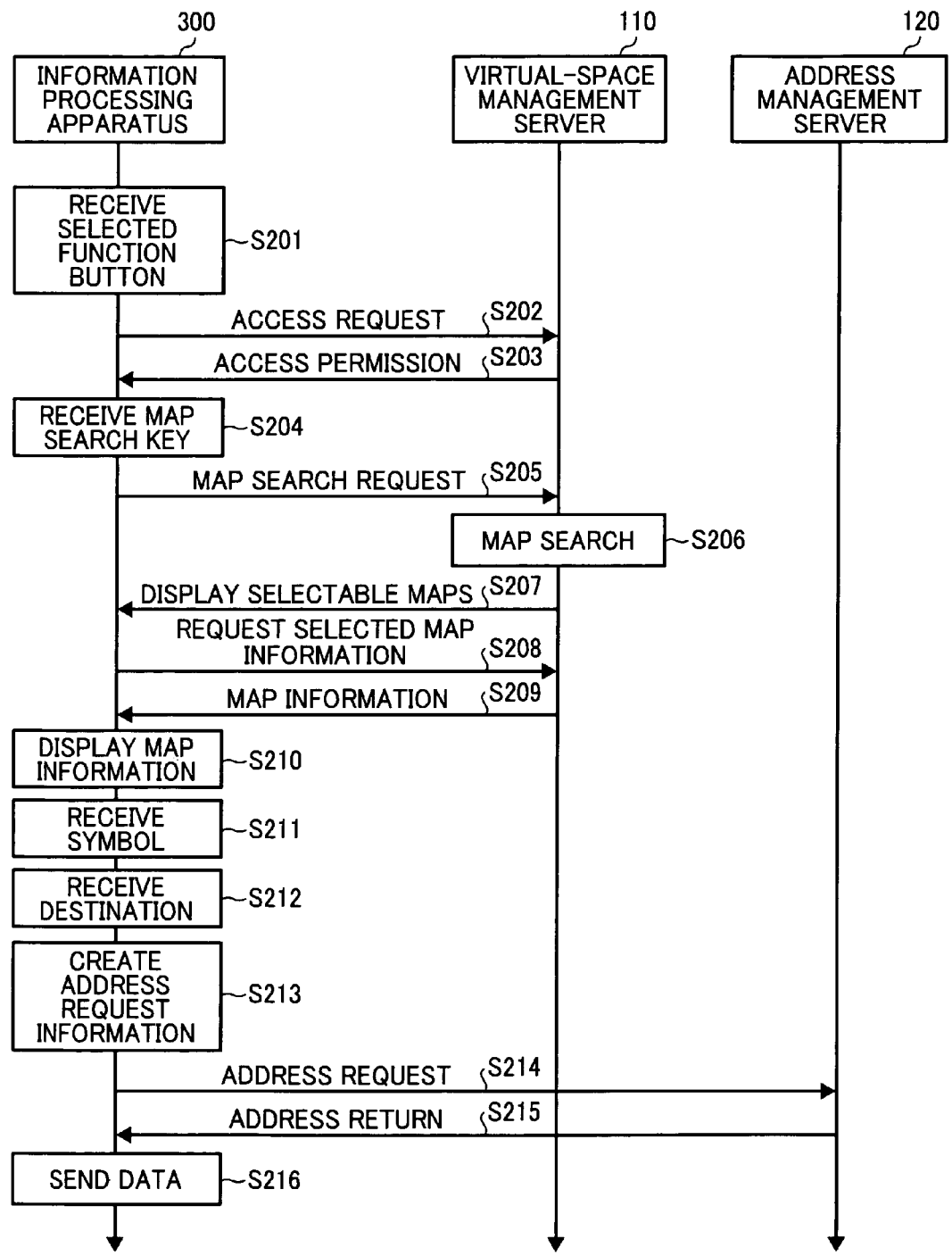
FIG. 11 is a general sequence diagram of the data sending process shown in FIG. 4.

With reference to the sequence diagram, the flow of the data sending process is described below. FIG. 11 is a general sequence diagram of the data sending process shown in FIG. 4.

The receiving unit 312 of the information processing apparatus 300 receives the selected function button that is allocated to access activity to the virtual-space management server 110 (Step S201). The authentication process is then performed between the access control unit 317 and the virtual-space management server 110. For example, the access control unit 317 sends both the access request and the authentication information that contains the user name and the password to the virtual-space management server 110 (Step S202). The virtual-space management server 110 determines using the authentication information whether the information processing apparatus 300a is authentic. If the information processing apparatus 300a is authentic, the virtual-space management server 110 sends an access permission to the information processing apparatus 300 (Step S203).

After that, the receiving unit 312 of the information processing apparatus 300 receives a search key to search for any map information that satisfies the search key (Step S204). The search screen shown in FIG. 8 is used in this example. The access control unit 317 sends a map-information search request containing the received search key to the virtual-space management server 110 (Step S205). In response to the search request, the virtual-space management server 110 searches for any map information that satisfies the search key (Step S206). If, for example, a certain location name is designated as the search key, the virtual-space management server 110 searches for map information that is the same as or similar to the designated location name.

After that, the virtual-space management server 110 sends, to the information processing apparatus 300, the search result that contains information for identifying map information that is selectable to be the map information to be displayed (e.g., the name of the map information) (Step S207). The information processing apparatus 300 displays the received identification information on the display unit 320. The user selects the identification information of the desired map information from the selectable map information displayed. The receiving unit 312 receives the selected ID.

When the ID is selected, the access control unit 317 requests the virtual-space management server 110 to acquire the map information of the selected identification information (specified map information) (Step S208). The virtual-space creating unit 112 of the virtual-space management server 110 creates the map information (e.g., 3D CG map information) that is identified by the requested ID and sends the created map information to the information processing apparatus 300 (Step S209).

The display control unit 311 of the information processing apparatus 300 displays the received map information on the display unit 320 (Step S210). The user can select, via, for example, the avatar that is present in the displayed map information, any icons each corresponding to an object (e.g., MFP) that is present in the map information.

When the user selects an icon (symbol) on the map information, the receiving unit 312 receives the icon (symbol) that has been selected by the user (Step S211). After that, the receiving unit 312 receives a selected destination of the image data to be processed (Step S212).

The status acquiring unit 315 then creates information containing an address request that is used to request the address management server 120 for the address information that is assigned to the destination (Step S213). If, for example, the virtual space is selected to be the destination, the status acquiring unit 315 creates the address request information that contains the MFP-ID of the MFP corresponding to the selected icon and information indicating that this request is a request for the virtual-MFP address. The status acquiring unit 315 then sends the created address request information to the address management server 120 (Step S214).

The virtual-space management server 110 acquires, in accordance with the address request information, the address information assigned to the MFP (the real-MFP address or the virtual-MFP address) from the device-information storage unit 121 and sends the acquired information to the information processing apparatus 300 (Step S215).

The output control unit 313 of the information processing apparatus 300 sends the image data to the received address (Step S216), and thus the data sending process goes to end.

Figure 12:
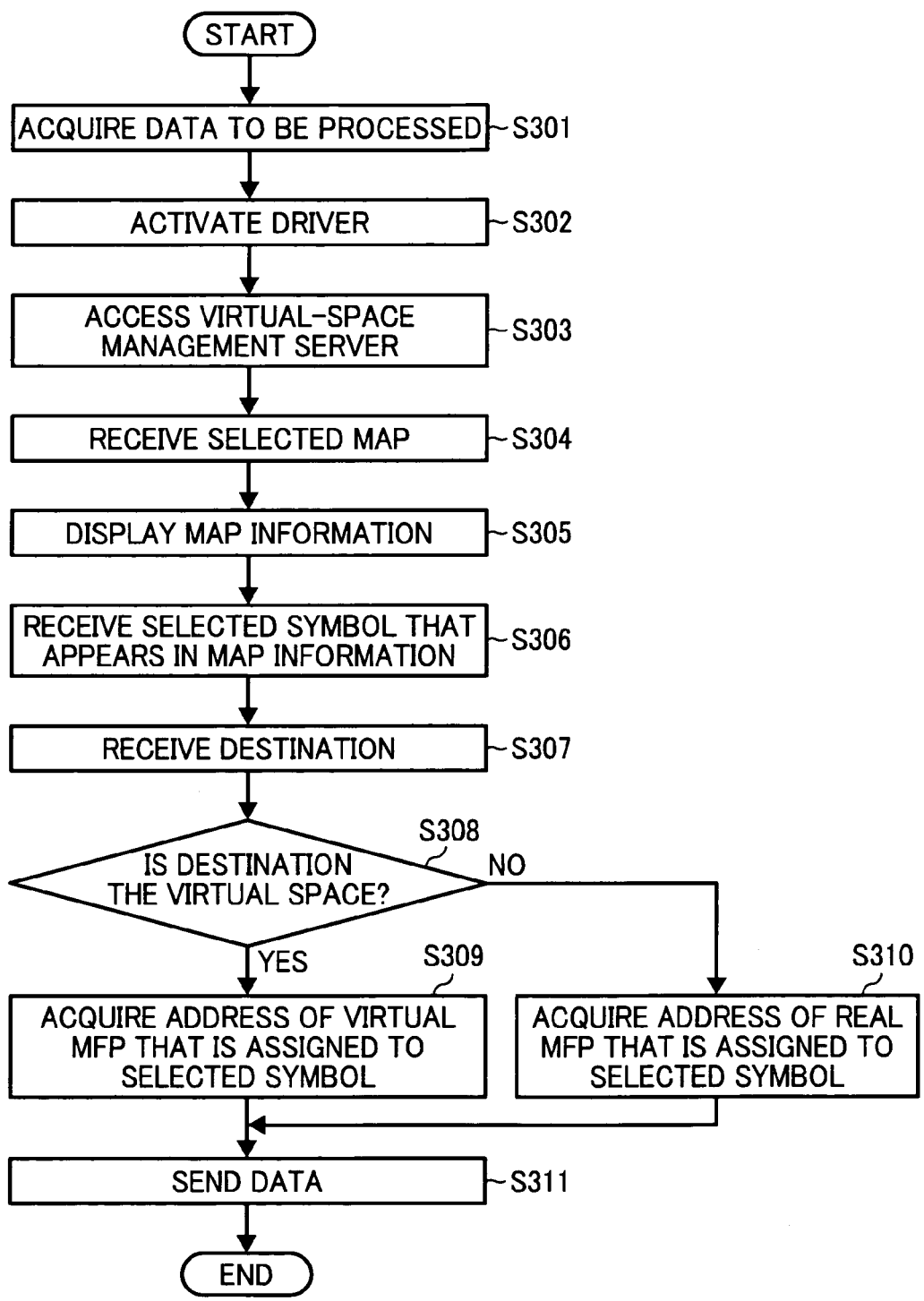
FIG. 12 is a flowchart of another example of the data sending process according to the first embodiment.

A data sending process is described below with reference to FIG. 12 when the information processing apparatus 300 is a PC (the information processing apparatus 300b). FIG. 12 is a flowchart of another example of the data sending process according to the first embodiment.

The data acquiring unit 314 acquires image data to be processed (Step S301). In the case of a PC, for example, the data acquiring unit 314 acquires image data from an inner storage unit thereof (not shown) or an external device. After that, the output control unit 313 activates a driver for enabling access activity to the virtual-space management server 110 (Step S302).

The processes from Steps S303 to S306 are performed in the same manner as the processes from Steps S102 to S105 of FIG. 4; therefore, the same description is not repeated. The processes from Steps S307 to S311 are performed in the same manner as the processes from Steps S107 to S111 of FIG. 4; therefore, the same description is not repeated.

Up to the present, the image data has been sent to the destination, regardless of the operating status of the MFP 250 that is selected to be the destination. However, if, especially, the destination is the real MFP 250, there is a possibility that the destination that receives the image data cannot process the image data correctly because of effects of usage by another user, failure, etc.

A later-described modification involves switching the processes in accordance with the function (static information), the operating status (dynamic information), etc., of the MFP 250 that is selected to be the destination. In the following, a process is also described for editing the acquired image data to be processed. The editing activity is independent of the activity of switching the processes in accordance with the operating status, etc. The editing activity can be added to, for example, the above-described flowchart of FIG. 4.

Figure 13:
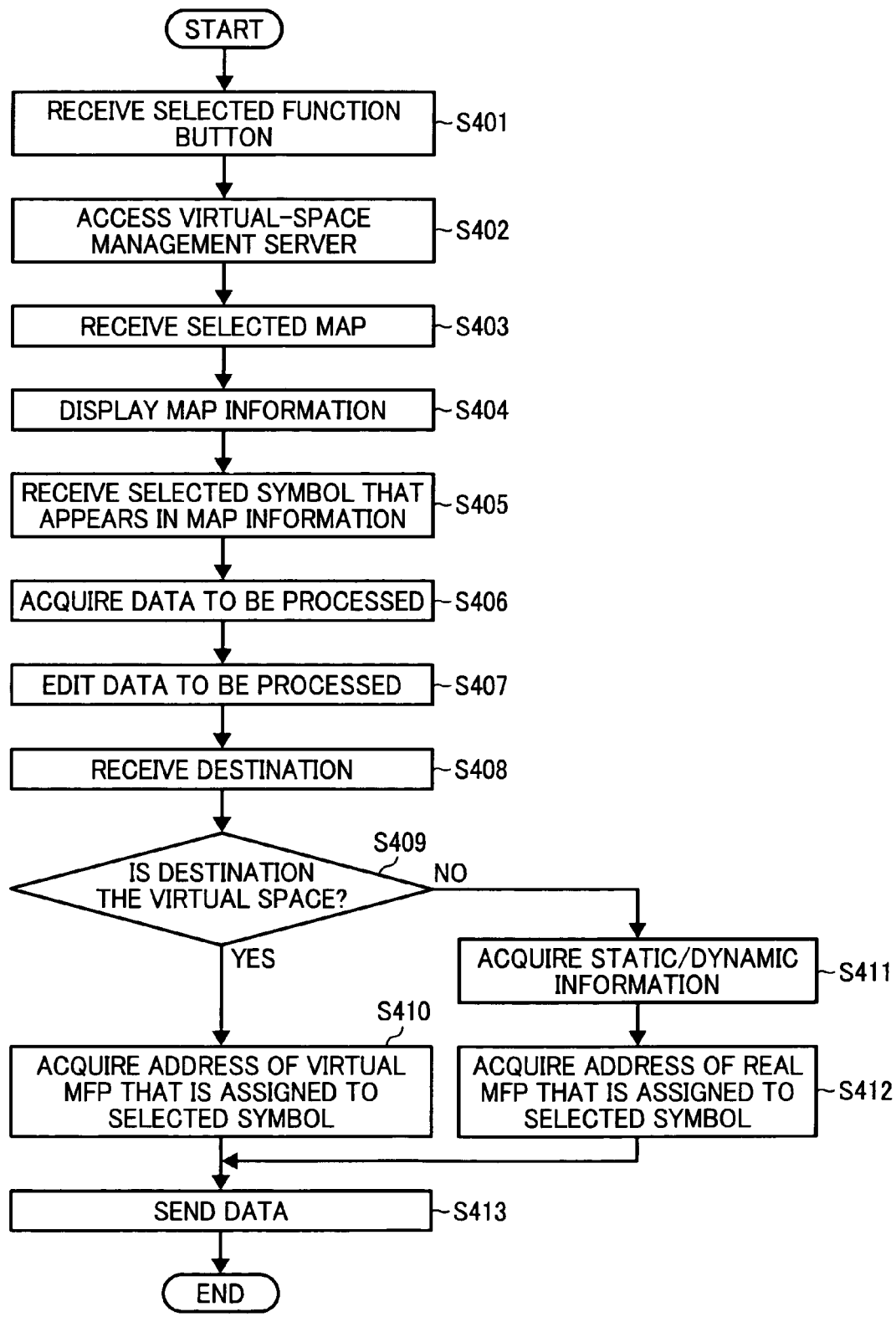
FIG. 13 is a flowchart of another example of the data sending process according to the first embodiment.

FIG. 13 is a flowchart of another example of the data sending process according to the first embodiment. FIG. 13 illustrates an example of the data sending process when, in the same manner as in FIG. 4, the information processing apparatus 300 is an MFP (the information processing apparatus 300a).

The processes from Steps S401 to S406 are performed in the same manner as the processes Steps S101 to S106 of FIG. 4; therefore, the same description is not repeated. After the image data to be processed is acquired at Step S406, the editing unit 316 edits the acquired image data (Step S407). The timing to perform the editing process can be set to be any timing so long as the editing process is completed before the time to send the image data to the destination.

The processes from Steps S408 to S410 are performed in the same manner as the processes Steps S107 to S109 of FIG. 4; therefore, the same description is not repeated.

If it is determined at Step S409 that the real world is selected (No at Step S409), the status acquiring unit 315 acquires the static information and the dynamic information assigned to the real MFP 250 corresponding to the selected icon (symbol) (Step S411).

The static information is, as described above, the functions of the MFP 250 and stored in a storage unit (not shown) included in the MFP 250. The dynamic information is, as described above, information indicative of the current operating status of the selected MFP 250. Each MFP 250 checks its operating status and sends the dynamic information that contains the operating status to the address management server 120 in real time.

As described above, in the present embodiment, the device-information storage unit 121 of the address management server 120 stores therein the static information and the dynamic information assigned to each MFP 250. Therefore, the status acquiring unit 315 acquires the static information and the dynamic information assigned to the selected MFP 250 from the device-information storage unit 121 of the address management server 120. As described above, it is allowable to configure the status acquiring unit 315 to directly acquire the static information and the dynamic information from the MFP 250.

When the dynamic information is acquired, the status acquiring unit 315 determines using the dynamic information whether the image data is receivable by the selected MFP 250. For example, the status acquiring unit 315 determines whether the queuing time of the selected MFP 250 is longer than a predetermined threshold. If the queuing time is longer than the threshold, the status acquiring unit 315 determines that the image data cannot be output, and the process control returns to the process of re-selecting the destination (Step S408). If the image data is receivable by the selected MFP 250, the selected MFP 250 is determined to be the destination and the image data is output to the selected MFP 250 (Steps S412 and S413). It is allowable to display the dynamic information on, for example, the display unit 320, which allows the user to determine whether the destination is to be changed.

If the selected MFP 250 is determined to be the destination, the output control unit 313 selects necessary processing functions from the acquired static information. After that, the output control unit 313 sends both the image data and the selected processing functions to the selected real MFP 250.

It is allowable, for example, to acquire information that contains a screen appearing on the operation panel of the selected MFP 250 from a storage unit (not shown) and display the screen on the display unit 320, which allows the user to select a desired processing function via the displayed screen.

As described above, in the information processing apparatus according to the first embodiment, when a symbol (icon) that is assigned to both the real image processing apparatus (MFP) and the virtual image processing apparatus (MFP), either the real world or the virtual space is further selected to be the destination of the image data to be processed. This enables, regardless whether the data is output toward either the real image processing apparatus or the virtual image processing apparatus, intuitional selection of the destination of the data. Thus, the data used in the real world is input to the virtual space in an easy way.

Although, in the above embodiment, the image processing apparatus is a multifunction peripheral (MFP) that has at least two functions selected from the copy function, the printing function, the scanning function and the facsimile function, the image processing apparatus can be any type of an image processing apparatus, such as a copying machine, a printer, a scanner, and a facsimile machine.

Second Embodiment

In the first embodiment, after the icon of the MFP is selected, either the real world or the virtual space is selected to be the destination of the image data. In a second embodiment, before the icon is selected, the destination is selected to be either the real world or the virtual space. After that, from the icons of the two or more MFPs, an icon is selected so that the destination of the image data is set to the corresponding MFP.

Figure 14:
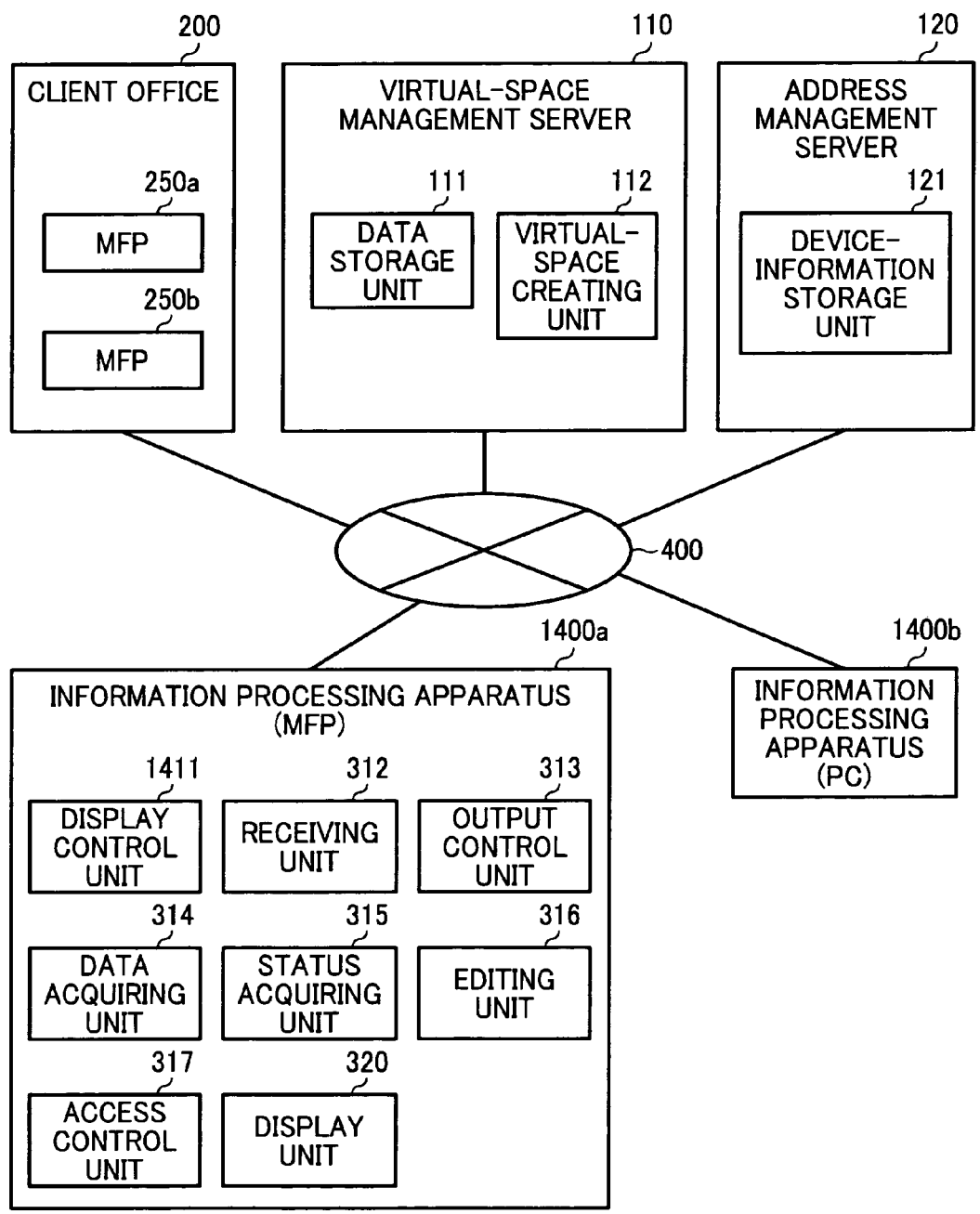
FIG. 14 is a block diagram of an example of the configuration of an information processing system that includes information processing apparatuses according to a second embodiment.

FIG. 14 is a block diagram of an example of the configuration of an information processing system that includes information processing apparatuses according to the second embodiment.

As shown in FIG. 14, the information processing system according to the second embodiment includes the client office 200, the virtual-space management server 110, the address management server 120, and information processing apparatuses 1400*a* and 1400*b* or 1400 where collectively referred to, all of which are connected to each other via the network 400.

The information processing apparatus 1400 used in the second embodiment has a display control unit 1411 that is different from the display control unit used in the first embodiment. The other configuration and functions are the same as the configuration and functions of the information processing system according to the first embodiment shown in the block diagram of FIG. 1; therefore, parts corresponding to those in the first embodiment are denoted with the same reference numerals, and the same description is not repeated.

The display control unit 1411 controls display on the display unit 320. The display control unit 1411 is different from the display control unit 311 according to the first embodiment in that, for example, the display control unit 1411 displays, before the map information, a destination selecting screen to receive the selected destination.

Figure 15:
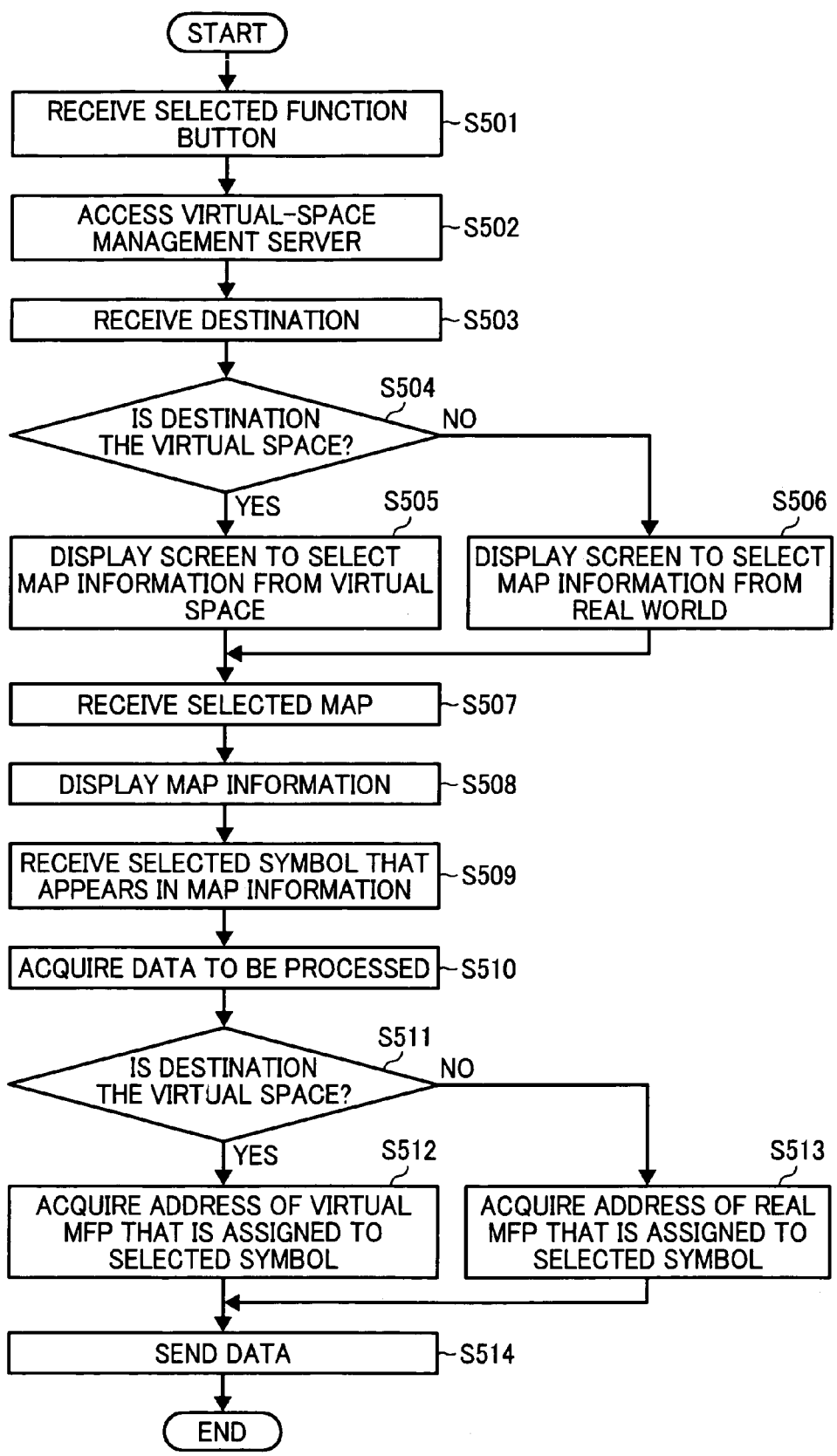
FIG. 15 is a general flowchart of a data sending process according to the second embodiment.

A data sending process performed by the information processing apparatus 1400 is described below with reference to FIG. 15 according to the second embodiment. FIG. 15 is a general flowchart of the data sending process according to the second embodiment.

The processes from Steps S501 and S502 are performed in the same manner as the processes from Steps S101 and S102 of FIG. 4; therefore, the same description is not repeated.

Figure 16:
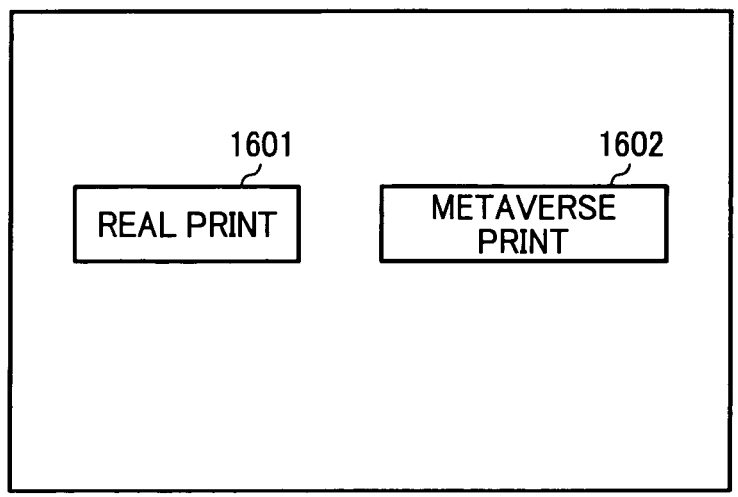
FIG. 16 is a schematic diagram of an example of a destination selecting screen according to the second embodiment.

If an access permission is received from the virtual-space management server 110, the display control unit 1411 displays the destination selecting screen that is used to select the destination, first. FIG. 16 is a schematic diagram of an example of the destination selecting screen according to the second embodiment. In the example shown in FIG. 16, there are buttons 1601 and 1602. When the button 1601 is pressed, the real world is selected to be the destination. When the button 1602 is pressed, the virtual world is selected to be the destination.

Referring back to FIG. 15, the receiving unit 312 receives the selected destination (Step S503). The display control unit 1411 then determines whether the selected destination is the virtual space (Step S504). If the virtual space is selected (Yes at Step S504), the display control unit 1411 displays the screen on the display unit 320 to receive selected map information of the virtual space (Step S505).

Figure 17:
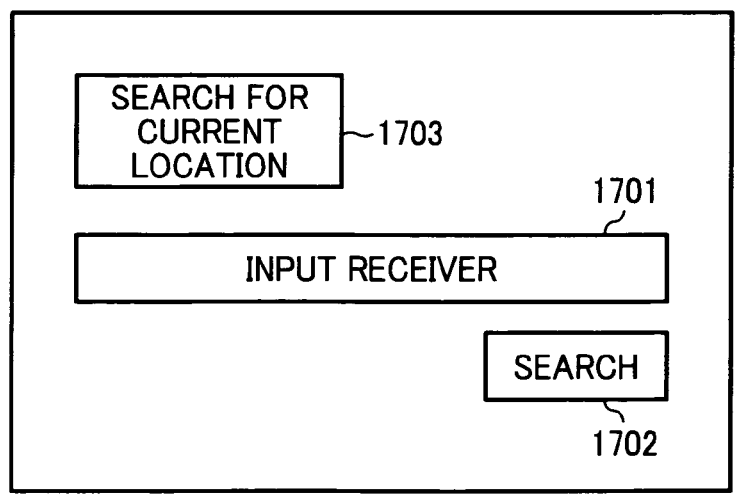
FIG. 17 is a schematic diagram of an example of the search screen that is used to search for map information.

FIG. 17 is a schematic diagram of an example of the search screen that is used to search for map information. The search screen is displayed at Step S505. If the search screen shown in FIG. 17 is used, the user inputs, to a text box 1701 with the message, for example, "Input a receiver", the user name of the receiver and presses a search button 1702. The map information is then selected in accordance with, for example, the department to which the specified receiver belongs. When a search-for-current-location button 1703 is pressed, the map information of a virtual space is selected where the avatar representing the specified receiver is present. As described above, in the present embodiment, when the virtual space is selected to be the destination and a certain user is selected to be the receiver, the map information of the virtual space where the receiver is present is selected easily as the search result.

Although the above map-information selecting method uses the search screen shown in FIG. 17, some other methods can be used. For example, it is allowable to select map information using any screen shown in FIGS. 5 to 8 of the first embodiment.

If the virtual space is not selected, i.e., the real world is selected (No at Step S504), the display control unit 1411 displays the screen on the display unit 320 to select map information from the real world (Step S506).

In this case, the display control unit 1411 displays any screen the same as, for example, those shown in FIGS. 5 to 8 of the first embodiment to select map information. It is noted that, in the first embodiment, after an icon is selected from the map information, the user selects either the real world or the virtual world to be the destination. This means that, in the first embodiment, the icon that is present in the map information is assigned to both the real object and the virtual object. In other words, it is assumed, in the first embodiment, that the map information of the virtual world is used that reflects information about the real world.

In contrast, in the second embodiment, because the destination is selected first, the map information can be switched in accordance with the selected destination. Therefore, it is allowable, for example, to display the map information of the virtual space when the virtual space is selected to be the destination, and display the map information of the real world that is different from the map information of the virtual space when the real space is selected to be the destination.

Referring back to FIG. 15, the receiving unit 312 receives the selected map information via the screen on the display unit 320 (Step S507). After that, the display control unit 1411 displays the selected map information on the display unit 320 (Step S508).

The processes from Steps S509 and S510 are performed in the same manner as the processes from Steps S105 and S106 of FIG. 4; therefore, the same description is not repeated. The processes from Steps S511 to S514 are performed in the same manner as the processes from Steps S108 to S111 of FIG. 4; therefore, the same description is not repeated.

As described above, in the information processing apparatus according to the second embodiment, after either the real world or the virtual space is selected to be the destination, a symbol (icon) assigned to an image processing apparatus (MFP) is further selected to set the image processing apparatus to be the destination of the image data. This enables, regardless whether the data is output to either the real image processing apparatus or the virtual image processing apparatus, intuitional selection of the destination of the data. Thus, the data used in the real world is input to the virtual space in an easy way.

Figure 18:
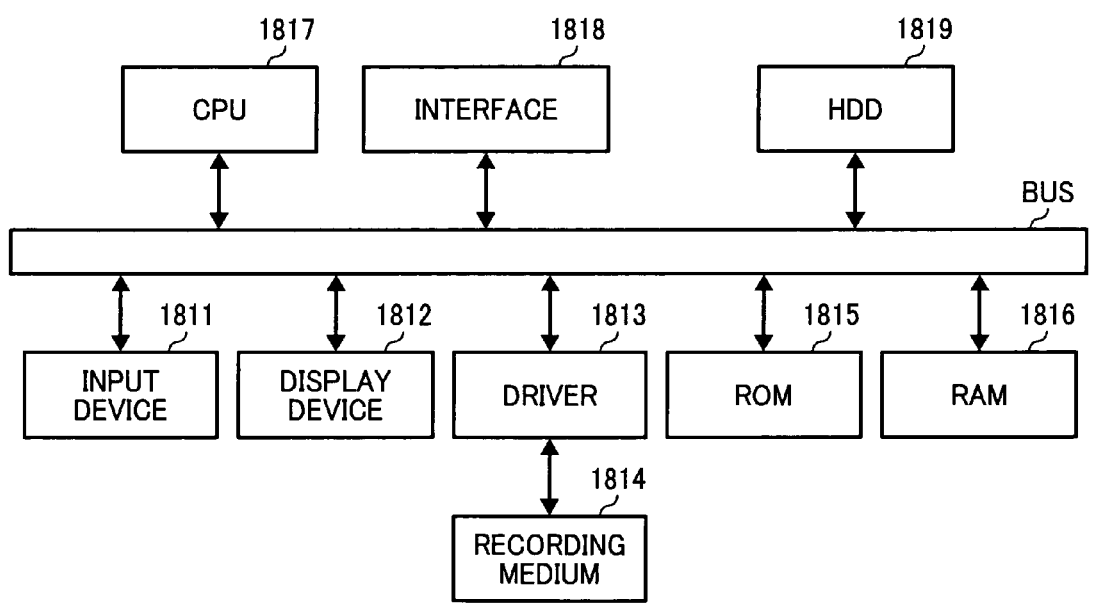
FIG. 18 is a block diagram of an example of the hardware configuration of the information processing apparatus.

The hardware configuration of the information processing apparatus 300a is described below with reference to FIG. 18. The information processing apparatus 300a is a PC. FIG. 18 is a block diagram of an example of the hardware configuration of the information processing apparatus 300a.

As shown in FIG. 18, the information processing apparatus 300a includes an input device 1811, a display device 1812, a driver 1813, a recording medium 1814, a read only memory (ROM) 1815, a RAM 1816, a central processing unit (CPU) 1817, an interface 1818, and an HDD 1819, these connected to each other via a bus.

The input device 1811 is a keyboard, a mouse, and etc., with which the user operates the information processing apparatus 300a. The input device 1811 is used to input various operation signals to the information processing apparatus 300a.

The display device 1812 is a display, etc., operable by the user of the information processing apparatus 300a. The display device 1812 displays information thereon.

The interface 1818 is an interface that connects the information processing apparatus 300a to a network or similar.

Computer programs, etc., that are executed by the information processing apparatus 300a to perform various processes on the information processing apparatus 300a are provided for the information processing apparatus 300a via the recording medium 1814, such as a CD-ROM, or downloaded to the information processing apparatus 300a via a network. The recording medium 1814 is attached to the driver 1813 and then the above computer programs, etc., are sent from the recording medium 1814 to the ROM 1815 via the driver 1813.

The ROM 1815 stores therein data, the above computer programs, etc. When the information processing apparatus 300a is activated, the RAM 1816 reads the above computer programs, etc., from the ROM 1815 and stores therein the read computer programs, etc. The CPU 1817 performs processes in accordance with the above computer programs, etc., that are read by the RAM 1816 and stored in the RAM 1816.

The HDD 1819 stores therein data and files.

The hardware configurations of the virtual-space management server 110 and the address management server 120 are the same as the hardware configuration of the information processing apparatus 300a shown in FIG. 18.

Figure 19:
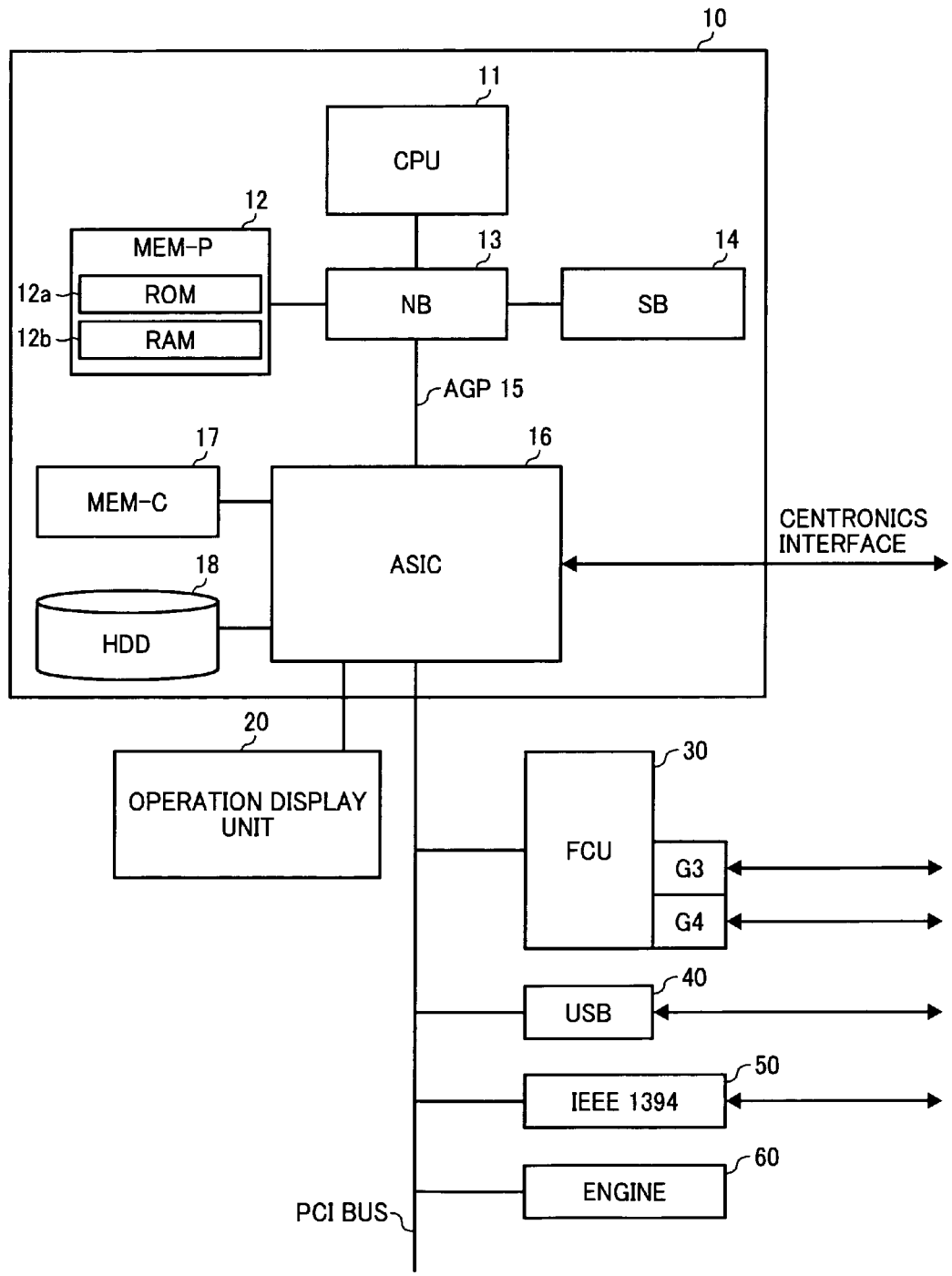
FIG. 19 is a block diagram of an example of the hardware configuration of the MFP.

The hardware configuration of the MFPs 250a and 250b shown in FIG. 1 and the hardware configuration of the information processing apparatus 300b that is an image processing apparatus (MFP) (hereinafter, "MFP") are described below with reference to FIG. 19. FIG. 19 is a block diagram of an example of the hardware configuration of the MFP.

As shown in FIG. 19, the MFP includes a controller 10 and an engine unit 60 that are connected to each other via a peripheral component interconnect (PCI) bus. The controller 10 controls the MFP and also controls drawing, communications and instructions received from an operation unit (not shown). The engine unit 60 is, for example, a printer engine connectable to the PCI bus, more particularly, a black-and-white plotter, a single-drum color plotter, a four-drum color plotter, a scanner, a facsimile unit, or similar. The engine unit 60 includes not only the engine section, such as a plotter, but also a data processing section that performs processes, such as error diffusion and gamma conversion.

The controller 10 includes a CPU 11, a north bridge (NB) 13, a system memory (MEM-P) 12, a south bridge (SB) 14, a local memory (MEM-C) 17, an application specific integrated circuit (ASIC) 16, and a hard disk drive (HDD) 18. The NB 13 is connected to the ASIC 16 via an accelerated graphics port (AGP) bus 15. The MEM-P 12 includes a ROM 12a and a RAM 12b.

The CPU 11 controls the MFP. The CPU 11 has a chipset that includes the NB 13, the MEM-P 12, and the SB 14. The CPU 11 is connected to some other devices via the chipset.

The NB 13 is a bridge that connects the CPU 11 to the MEM-P 12, the SB 14, and the AGP 15. The NB 13 includes a memory controller that controls read/write from/to the MEM-P 12, a PCI master, and an AGP target.

The MEM-P 12 is a system memory that is used as a storage memory that stores therein computer programs and data, a load memory on which computer programs and data are loaded, a draw memory for a printer, etc. The MEM-P 12 includes the ROM 12a and the RAM 12b. The ROM 12a is a read only memory that is used as a storage memory that stores therein computer programs and data. The RAM 12*b* is a read/write memory that is used as a load memory on which computer programs and data are loaded, a draw memory for a printer, etc.

The SB 14 is a bridge that connects the NB 13 to PCI devices and peripheral devices. The SB 14 is connected to the NB 13 via the PCI bus. The PCI bus is connected to a network interface (I/F), etc.

The ASIC 16 is an integrated circuit (IC) for image processing that has the hardware component for image processing. The ASIC 16 works as a bridge that connects the AGP 15, the PCI bus, the HDD 18, and the MEM-C 17 to each other. The ASIC 16 includes a PCI target, an AGP master, an arbiter (ARB) that is the main component of the ASIC 16, a memory controller that controls the MEM-C 17, a plurality of direct memory access controllers (DMAC) that, for example, rotate image data using the hardware logics, and a PCI unit that sends/receives data to/from the engine unit 60 via the PCI bus. The ASIC 16 is connected to a facsimile control unit (FCU) 30, a universal serial bus (USB) 40, an IEEE-1394 (the Institute of Electrical and Electronics Engineers 1394) I/F 50 via the PCI bus. An operation display unit 20 is directly connected to the ASIC 16.

The MEM-C 17 is a local memory that is used as a copy image buffer and a code buffer. The HDD 18 is storage that stores therein image data, computer programs, font data, forms (first data storage unit).

The AGP 15 is a bus interface for graphics accelerator card that performs a high-speed graphics process. The AGP 15 directly accesses the MEM-P 12 at a high throughput so that the graphics accelerator card operates at a high speed.

The computer programs that are executed by the information processing apparatus 300 according to the first embodiment and the second embodiment are prestored in a ROM or the like.

The computer programs that are executed by the information processing apparatus according to the first embodiment and the second embodiment can be stored in a form of a file that is installable and executable on a computer, in a recording medium readable by the computer, such as a CD-ROM, a flexible disk (FD), a CD-R, and a digital versatile disk (DVD).

The computer programs that are executed by the information processing apparatus according to the first embodiment and the second embodiment can be stored in another computer connected to the computer via a network such as the Internet, and downloaded to the computer via the network. The computer programs that are executed by the information processing apparatus according to the first embodiment and the second embodiment can be delivered or distributed via a network such as the Internet.

The computer programs that are executed by the information processing apparatus according to the first embodiment and the second embodiment are, for example, made up of modules that implement the above units (the display control unit, the receiving unit, the output control unit, the data acquiring unit, the status acquiring unit, the editing unit, and the access control unit) as software. When the CPU (processor) reads the computer programs from the ROM and executes the computer programs, the above modules are loaded and created on a main memory thereby implementing the above units.

According to the advantages of the embodiment of the present invention, it is possible to input information of the real world into the virtual space with ease.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus that is connected to both an image processing apparatus and a virtual-space management device via a network, wherein
   the image processing apparatus includes a first data storage unit of a multipurpose peripheral, and
   the virtual-space management device manages a virtual space that contains a virtual device that is created by virtualizing the image processing apparatus and includes a second data storage unit for the virtual device, the information processing apparatus comprising:
   a display control unit that displays map information on a display unit, wherein a device symbol that corresponds to the image processing apparatus is present at a position corresponding to a position of the image processing apparatus in a real world;
   a receiving unit that receives a selection of the device symbol in the map information; and
   an output control unit that outputs image data to the first data storage unit of the image processing apparatus that corresponds to the selected device symbol if the first data storage unit is a selected designation for the image data, and outputs the image data to the second data storage unit for the virtual device that is created by virtualizing the image processing apparatus and corresponds to the selected device symbol, if the second data storage unit is the selected designation for the image data.

2. The information processing apparatus according to claim 1, wherein
   the receiving unit further receives a selected destination of the image data that is either the real world or the virtual space,
   if the real world is selected to be the destination, the output control unit outputs the image data to the first data storage unit of the image processing apparatus that corresponds to the selected device symbol, and, if the virtual space is selected to be the destination, the output control unit outputs the image data to the second data storage unit for the virtual device that is created by virtualizing the image processing apparatus and corresponds to the selected device symbol.

3. The information processing apparatus according to claim 2, further comprising
   a status acquiring unit that acquires, if the real world is selected to be the destination, an operating status of the image processing apparatus that corresponds to the selected device symbol, wherein
   if the real world is selected as the destination and the acquired operating status indicates that the image data is in a state to be output, the output control unit outputs the image data to the first data storage unit of the image processing apparatus that corresponds to the selected device symbol.

4. The information processing apparatus according to claim 2, wherein the display control unit displays different map information on the display unit in accordance with the selected destination.

5. The information processing apparatus according to claim 1, wherein the map information is information for illustrating an area of the image processing apparatus in a three-dimensional manner and includes the device symbol that corresponds to the image processing apparatus arranged at the position corresponding to the position of the image processing apparatus in the real world.

6. The information processing apparatus according to claim 1, further comprising
 a data acquiring unit that reads an original, thereby acquiring the image data, and
 wherein the output control unit outputs the acquired image data that has been read from the original to either the first data storage unit of the image processing apparatus that corresponds to the selected device symbol or to the second data storage unit for the virtual apparatus that is created by virtualizing the image processing apparatus that corresponds to the selected device symbol.

7. The information processing apparatus according to claim 1, wherein
 the display control unit displays on the display unit the map information that contains both the display symbol and a user symbol that corresponds to a user, and
 the receiving unit receives, via the user symbol, the selected device symbol.

8. The information processing apparatus according to claim 1, wherein
 the receiving unit receives selected map information to be displayed, and
 the display control unit displays the selected map information on the display unit.

9. The information processing apparatus according to claim 1, further comprising
 an editing unit that edits the image data, wherein
 the output control unit outputs the edited image data to the first data storage unit of the image processing apparatus that corresponds to the selected device symbol or to the second data storage unit for the virtual apparatus that is created by virtualizing the image processing apparatus that corresponds to the selected device symbol.

10. A non-transitory computer-readable medium having a program including instructions for an information processing apparatus that is connected to both an image processing apparatus and a virtual-space management device via a network, wherein
 the image processing apparatus includes a first data storage unit of a multipurpose peripheral, and
 the virtual-space management device manages a virtual space that contains a virtual device that is created by virtualizing the image processing apparatus and includes a second data storage unit for the virtual device, the instructions causing the information processing apparatus to function as:
 a display control unit that displays map information on a display unit, wherein a device symbol that corresponds to the image processing apparatus is present at a position corresponding to a position of the image processing apparatus in a real world;
 a receiving unit that receives a selection of the device symbol in the map information; and
 an output control unit that outputs image data to the first data storage unit of the image processing apparatus that corresponds to the selected device symbol if the first data storage unit is a selected designation for the image data, and outputs the image data to the second data storage unit for the virtual device that is created by virtualizing the image processing apparatus and corresponds to the selected device symbol, if the second data storage unit is the selected designation for the image data.

11. The computer-readable medium according to claim 10, wherein
 the receiving unit further receives a selected destination of the image data that is either the real world or the virtual space,
 if the real world is selected to be the destination, the output control unit outputs the image data to the first data storage unit of the image processing apparatus that corresponds to the selected device symbol, and, if the virtual space is selected to be the destination, the output control unit outputs the image data to the second data storage unit for the virtual device that is created by virtualizing the image processing apparatus and corresponds to the selected device symbol.

12. The computer-readable medium according to claim 11, the instructions further causing the information processing apparatus to function as a status acquiring unit that acquires an operating status of the image processing apparatus that corresponds to the selected device symbol, if the real world is selected to be the destination, wherein
 if the real world is selected as the destination and the acquired operating status indicates that the image data is in a state to be output, the output control unit outputs the image data to the first data storage unit of the image processing apparatus that corresponds to the selected device symbol.

13. The computer-readable medium according to claim 11, wherein the display control unit displays different map information on the display unit in accordance with the selected destination.

14. The computer-readable medium according to claim 10, wherein the map information is information for illustrating an area of the image processing apparatus in a three-dimensional manner and includes the device symbol that corresponds to the image processing apparatus arranged at the position corresponding to the position of the image processing apparatus in the real world.

15. The computer-readable medium according to claim 10, the instructions further causing the information processing apparatus to function as a data acquiring unit that acquires the image data by reading an original, and wherein the output control unit outputs the acquired image data that has been read from the original to either the first data storage unit of the image processing apparatus that corresponds to the selected device symbol or the second data storage unit for the virtual apparatus that is created by virtualizing the image processing apparatus that corresponds to the selected device symbol.

16. The computer-readable medium according to claim 10, wherein
 the display control unit displays on the display unit the map information that contains both the display symbol and a user symbol that corresponds to a user, and
 the receiving unit receives, via the user symbol, the selected device symbol.

17. The computer-readable medium according to claim 10, wherein
 the receiving unit further receives selected map information to be displayed, and
 the display control unit displays the selected map information on the display unit.

18. The computer-readable medium according to claim 10, the instructions further causing the information processing apparatus to function as an editing unit that edits the image data, and
 wherein the output control unit outputs the edited image data to the first data storage unit of the image processing apparatus that corresponds to the selected device symbol or to the second data storage unit for the virtual apparatus that is created by virtualizing the image processing apparatus that corresponds to the selected device symbol.

19. The information processing apparatus according to claim 1, wherein the output control unit determines which of the first data storage unit and the second data storage unit to output image data based on a request received from the receiving unit.

* * * * *